(12) United States Patent
Ichikawa (10) Patent No.: US 10,902,407 B2
(45) Date of Patent: Jan. 26, 2021

(54) PAYMENT DEVICE AND SALES PROCESSING DEVICE

(71) Applicant: TOSHIBA TEC KABUSHIKI KAISHA, Tokyo (JP)

(72) Inventor: Takashi Ichikawa, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/516,106

(22) Filed: Jul. 18, 2019

(65) Prior Publication Data

US 2020/0104821 A1 Apr. 2, 2020

(30) Foreign Application Priority Data

Oct. 1, 2018 (JP) .................................. 2018-186766

(51) Int. Cl.
*G06Q 20/32* (2012.01)
*H04W 4/80* (2018.01)
*G06F 3/0488* (2013.01)

(52) U.S. Cl.
CPC ....... *G06Q 20/327* (2013.01); *G06F 3/04886* (2013.01); *H04W 4/80* (2018.02)

(58) Field of Classification Search
CPC ... G06Q 20/327; H04W 4/80; G06F 3/04886; G06F 3/0488; G06F 1/1626; G06F 1/1643; G06F 1/1698; G06F 3/0482; G06K 7/10356
USPC ...................................... 340/10.3
See application file for complete search history.

(56) References Cited

U.S. PATENT DOCUMENTS

| 8,570,155 B2* | 10/2013 | Murakami | G06K 7/10316 235/380 |
| 10,148,304 B2* | 12/2018 | Chang | H04W 52/367 |
| 10,278,046 B2* | 4/2019 | Riess | H04W 4/80 |
| 10,318,952 B1* | 6/2019 | Wade | H04B 5/0075 |
| 10,608,329 B2* | 3/2020 | Jung | H01Q 1/273 |
| 2010/0137024 A1* | 6/2010 | Maguire | H04B 1/58 455/552.1 |
| 2012/0075072 A1* | 3/2012 | Pappu | H04B 5/0062 340/10.1 |

(Continued)

FOREIGN PATENT DOCUMENTS

| JP | 2003-162693 A | 6/2003 |
| JP | 2006-195925 A | 7/2006 |

(Continued)

OTHER PUBLICATIONS

Translation JP2009147895; translation of JP-2011-003150-A (Published data Jan. 6, 2011). Haraguchi et al. for the display device and the commodity sales data processing apparatus (Year: 2011).*

(Continued)

*Primary Examiner* — Nam V Nguyen
(74) *Attorney, Agent, or Firm* — Foley & Lardner LLP (57) ABSTRACT

A payment device includes a plurality of antennas and a payment unit. The payment unit performs a payment process for payment in which a payment service associated with a respective one of the plurality of antennas is used in accordance with start of wireless communication for the payment process via the respective one of the plurality of antennas.

13 Claims, 6 Drawing Sheets

(56) References Cited

U.S. PATENT DOCUMENTS

| | | | |
|---|---|---|---|
| 2013/0059532 A1 | 3/2013 | Mahanfar et al. | |
| 2013/0148636 A1* | 6/2013 | Lum | H04B 1/0067 370/336 |
| 2015/0180544 A1 | 6/2015 | Morimoto et al. | |
| 2018/0294546 A1* | 10/2018 | Yashiro | H04B 5/0087 |
| 2019/0227762 A1* | 7/2019 | Moriya | G06K 7/10297 |
| 2019/0274023 A1* | 9/2019 | Shiobara | G06K 7/10 |
| 2020/0104552 A1* | 4/2020 | Shiobara | G06K 7/10118 |

FOREIGN PATENT DOCUMENTS

| | | |
|---|---|---|
| JP | 2011-003150 A | 1/2011 |
| WO | WO-2018/174773 A1 | 9/2018 |

OTHER PUBLICATIONS

Extended European Search report issued in European Patent Application No. 19193130.2 dated Jul. 28, 2020, eight (8) pages.

\* cited by examiner

PAYMENT DEVICE AND SALES PROCESSING DEVICE

CROSS-REFERENCE TO RELATED APPLICATION

This application is based upon and claims the benefit of priority from Japanese Patent Application No. 2018-186766, filed on Oct. 1, 2018, the entire contents of which are incorporated herein by reference.

FIELD

Embodiments described herein relate generally to a payment device and a sales processing device.

BACKGROUND

There is a plurality of types of contactless electronic money payment services in which common communication schemes are used. Therefore, in a payment device and a sales processing device corresponding to electronic money payment, in the related art, it is necessary to recognize which electronic money payment service is used before payment data stored in a storage medium is acquired through contactless communication. Therefore, an operator designates a service. That is, when an electronic money service is used, an operator takes trouble to perform an operation of designating one service among a plurality of types of payment services. In view of such circumstances, it is desirable to reduce the trouble of the operation by the operator.

DETAILED DESCRIPTION

Embodiments provide a payment device and a sales processing device capable of reducing trouble of an operation by an operator.

In general, according to one embodiment, a payment device includes a plurality of antennas and a payment unit. The payment unit performs a payment process for payment in which a payment service associated with one antenna is used in accordance with start of wireless communication for the payment process via the one antenna among the plurality of antennas.

Hereinafter, an example of an embodiment will be described with reference to the drawings. In the embodiment, an example of a checkout device that has functions of a commodity registration device registering sales commodities and a payment device performing a process of paying prices of the registered sales commodities will be described.

Figure 1:
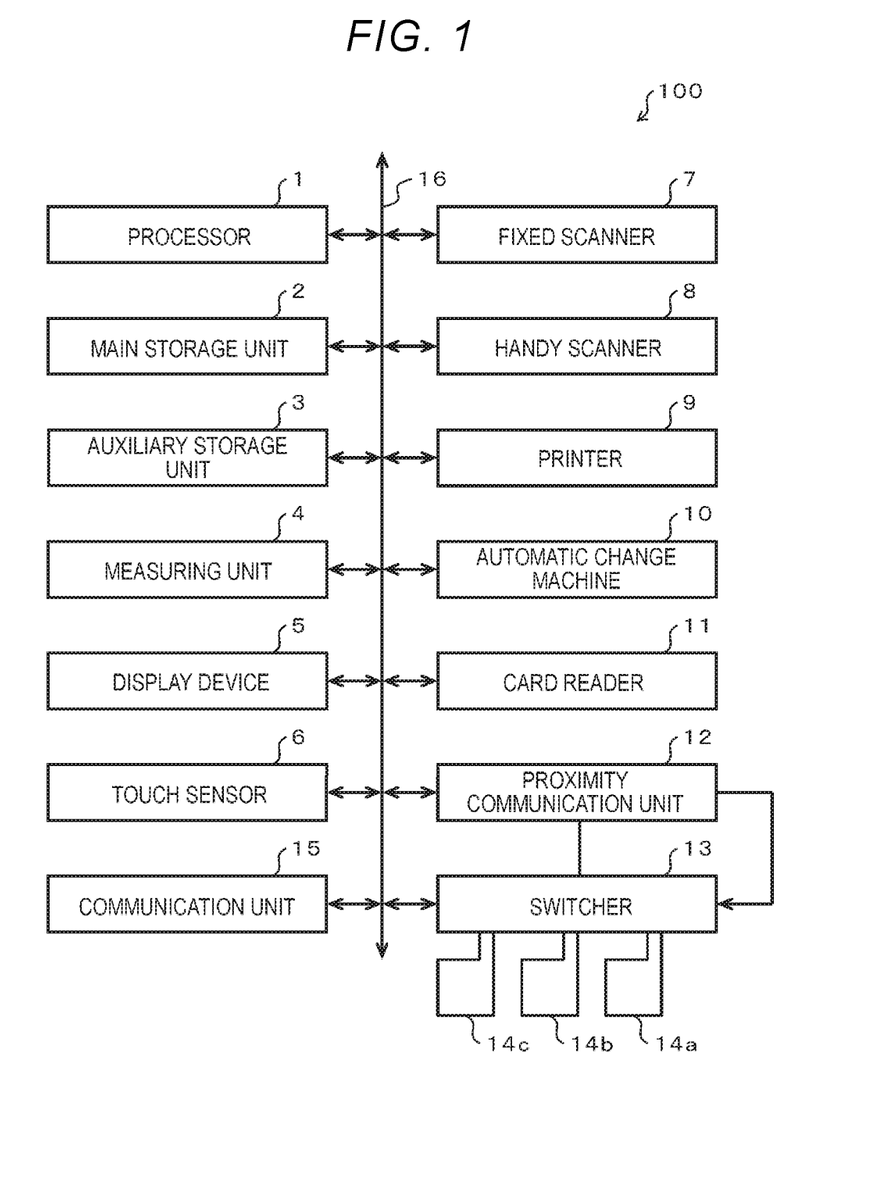
FIG. 1 is a block diagram illustrating a main unit circuit configuration of a checkout device according to an embodiment.

FIG. 1 is a block diagram illustrating a main unit circuit configuration of a checkout device 100 according to the embodiment. The checkout device 100 according to the embodiment is also called a self-checkout device, a self-checkout type of point-of-sales (POS) terminal, or a self-registration device. The checkout device 100 is mainly operated by a shopper. Accordingly, the shopper is an operator of the checkout device 100. Here, a store clerk can also be an operator of the checkout device 100.

The checkout device 100 includes a processor 1, a main storage unit 2, an auxiliary storage unit 3, a measuring unit 4, a display device 5, a touch sensor 6, a fixed scanner 7, a handy scanner 8, a printer 9, an automatic change machine 10, a card reader 11, a proximity communication unit 12, a switcher 13, antennas 14a, 14b, and 14c, a communication unit 15, and a transmission path 16. The processor 1, the main storage unit 2, and the auxiliary storage unit 3 are connected by the transmission path 16 to configure a computer that performs information processing to realize various functions of the checkout device 100.

The processor 1 is equivalent to a central unit of the computer. The processor 1 performs information processing to realize various functions of the checkout device 100 in accordance with an information processing program such as an operating system, middleware, and an application program. The processor 1 is, for example, a central processing unit (CPU).

The main storage unit 2 is equivalent to a main storage unit of the computer. The main storage unit 2 includes a nonvolatile memory region and a volatile memory region. The main storage unit 2 stores at least a part of the information processing program in the nonvolatile memory region. The main storage unit 2 stores data necessary for the processor 1 to perform a process of controlling each unit in the nonvolatile or volatile memory region in some cases. The main storage unit 2 uses a volatile memory region as a work area in which the processor 1 can appropriate rewrite data. The nonvolatile memory region is, for example, a read-only memory (ROM). The volatile memory region is, for example, a random access memory (RAM).

The auxiliary storage unit 3 is equivalent to an auxiliary storage unit of the computer. For example, an electric erasable programmable read-only memory (EEPROM), a hard disk drive (HDD), or a solid-state drive (SSD) is used as the auxiliary storage unit 3. The auxiliary storage unit 3 stores data used for the processor 1 to perform various processes or data generated through a process by the processor 1. The auxiliary storage unit 3 stores a part of the information processing program in some cases.

The measuring unit 4 measures the weight of a registered commodity. The display device 5 displays various screens for informing an operator of various kinds of information on a display surface. Some of the various screens configure a graphical user interface (GUI). For example, a liquid crystal panel or the like is used as the display device 5. The touch sensor 6 is superimposed on the display surface of the display device 5 and detects a touch position when a touch operation on the display surface is performed. Thus, the touch sensor 6 receives a touch operation for operating the GUI.

The fixed scanner 7 images a held commodity and then identifies a barcode displayed on the commodity through image processing. Then, the fixed scanner 7 outputs information indicating the identified barcode to the processor 1. As the fixed scanner 7, another type of known device that identifies a barcode using reflection of laser light can be used. The fixed scanner 7 may have a function of identifying a commodity using an object recognition technology based on a feature of an image of the commodity.

The handy scanner 8 is generally carried and used by the operator. The handy scanner 8 reads a barcode displayed on a commodity and outputs information represented by the barcode to the processor 1.

The printer 9 includes a receipt printer and a journal printer. The receipt printer issues various certificates by printing various kinds of information on a receipt sheet. The various certificates are receipts or the like representing content or the like of a commercial transaction. The journal printer prints journal data including information printed on a receipt sheet by the receipt printer on a journal sheet. The journal sheet is retained inside the checkout device 100 as long as a maintenance person is not taken out the journal sheet. The journal data may be stored in the auxiliary storage unit 3 in association with a transaction code for identifying an individual transaction and may be printed on a receipt sheet by the receipt printer as necessary. In this case, it is not necessary to include the journal printer in the printer 9.

The automatic change machine 10 receives input coins and paper money. The automatic change machine 10 discharges coins and paper money as change. The card reader 11 reads credit data recorded on a credit card and outputs the data to the processor 1. The credit data represents a credit card number, a holder name, an expiration period, a card brand, and the like.

The proximity communication unit 12 performs proximity wireless communication with an integrated circuit (IC) tag for electronic money payment via any of the antennas 14a, 14b, and 14c. That is, the proximity communication unit 12 is an example of a communication unit. The switcher 13 switches connection of the antenna to the proximity communication unit 12 among the antennas 14a, 14b, and 14c in a time division manner. That is, the switcher 13 is an example of a switching unit. The antennas 14a, 14b, and 14c each transmit and receive radio waves used for the proximity communication unit 12 to perform proximity wireless communication with an IC tag. Separate payment services provided by different electronic money payment service providers are associated in advance with the antennas 14a, 14b, and 14c, respectively. Any payment service may be arbitrarily associated with each of the antennas 14a, 14b, and 14c and a designer or a manager of the checkout device 100 may decide the association.

The communication unit 15 performs data communication with a device (not illustrated) connected to a communication network (not illustrated) in conformity with a predetermined communication protocol. A local area network (LAN) is generally used as the communication network. However, as the communication network, the Internet, a virtual private network (VPN), a public communication network, a mobile communication network, and the like can be appropriately used in combination with or independent of the LAN. A known device in conformity with a communication scheme of the communication network can be used as the communication unit 15. A partner device with which the communication unit 15 performs the data communication is, for example, a POS server or the like. The transmission path 16 includes an address bus, a data bus, and a control signal line and transmits data and a control signal exchanged with each of the connected units.

Figure 2:
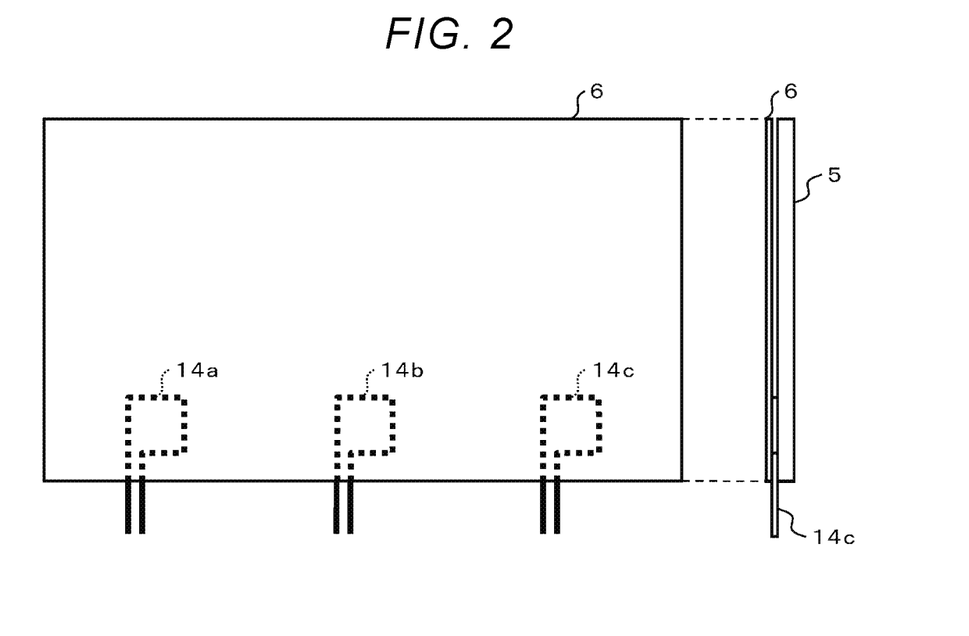
FIG. 2 is a diagram schematically illustrating disposition of antennas in FIG. 1.

FIG. 2 is a diagram schematically illustrating disposition of antennas 14a, 14b, and 14c. In FIG. 2, the same reference numerals are given to the same elements illustrated in FIG. 1. The antennas 14a, 14b, and 14c are each disposed on the display surface of the display device 5 at postures in which a direction intersecting the display surface is an orientation direction. The antennas 14a, 14b, and 14c are disposed to be separated from each other along the display surface of the display device 5. The antennas 14a, 14b, and 14c are formed of a transparent conductive material and transmit a screen displayed on the display device 5. The touch sensor 6 is disposed over the display device 5 and the antennas 14a, 14b, and 14c. The touch sensor 6 is also transparent and transmits a screen displayed on the display device 5. Thus, the display screen on the display device 5 can be viewed through the touch sensor 6 and the antennas 14a, 14b, and 14c. That is, the display device 5 and the touch sensor 6 configure a touch panel with the antennas 14a, 14b, and 14c interposed therebetween.

Next, an operation of the checkout device 100 that has the above-described configuration will be described. The processor 1 performs information processing to be described below when the checkout device 100 is set to an operation mode in which a process of checking out shopping of a shopper is performed in response to an operation by the shopper.

The main storage unit 2 or the auxiliary storage unit 3 stores an information processing program that describes information processing to be described below. The information processing program may be stored in the main storage unit 2 or the auxiliary storage unit 3 in hardware transfer of the checkout device 100 or may be transferred separately from the hardware. In the latter case, the information processing program may be recorded on a removable recording medium such as a magnetic disk, a magneto-optical disc, an optical disc, or a semiconductor memory or may be transferred via a network. In the latter case, for example, the information processing program is supplied as a version-updated program and is written on the auxiliary storage unit 3 by the processor 1 in accordance with an artificial operation. The information processing program is substituted with the same kind of another information processing program stored in advance in the main storage unit 2 or the auxiliary storage unit 3.

Figure 3:
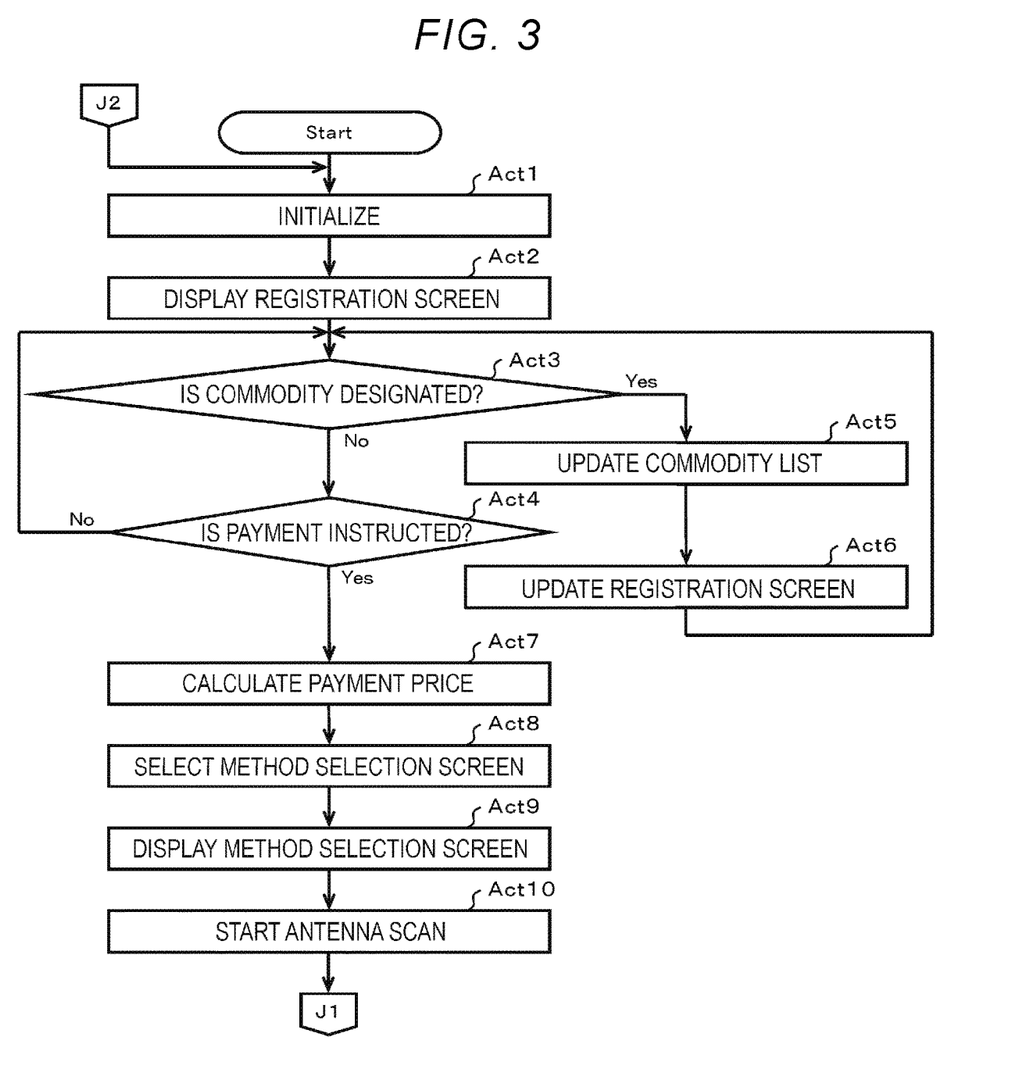
FIG. 3 is a flowchart illustrating information processing by a processor in FIG. 1.
Figure 4:
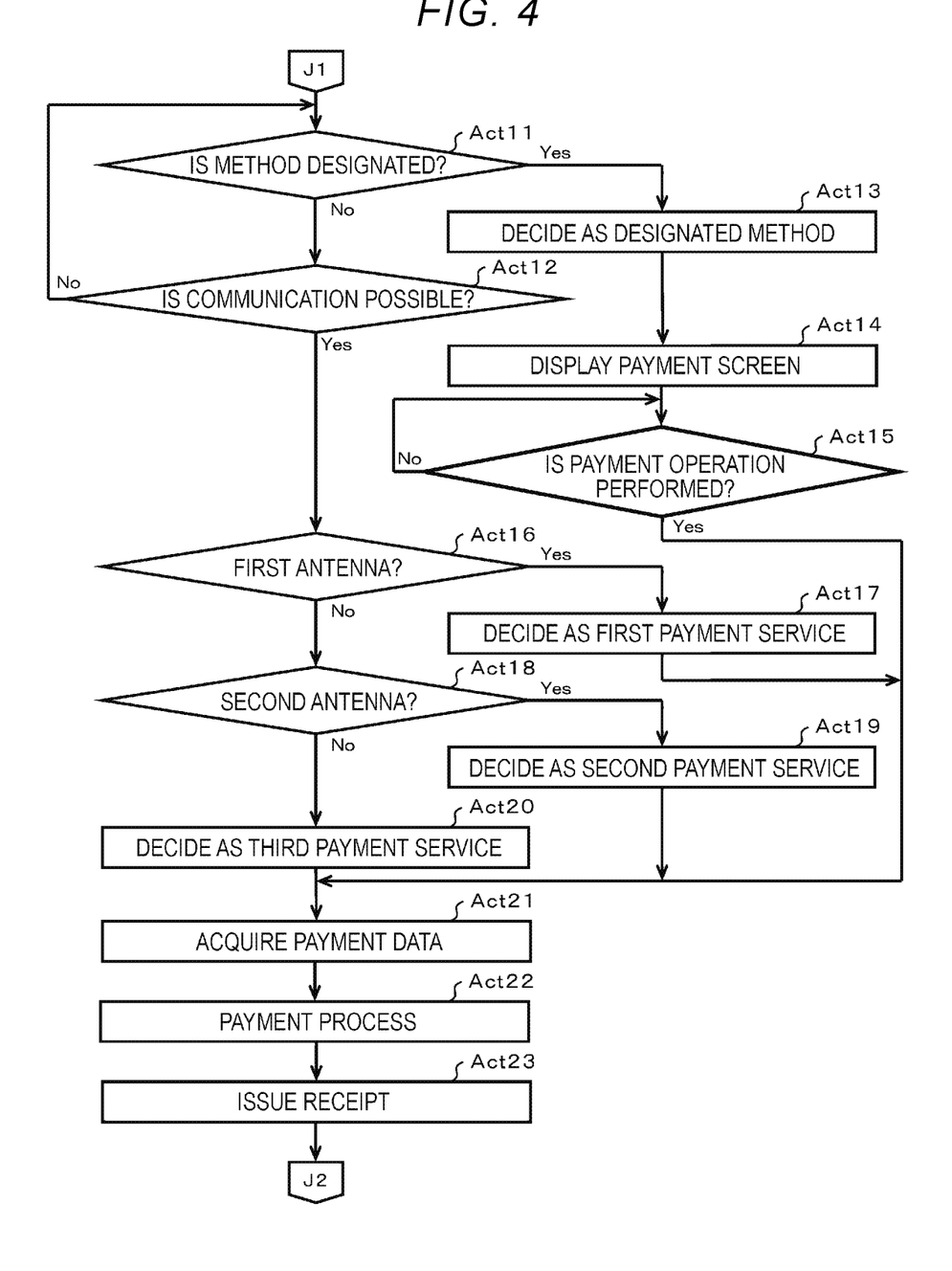
FIG. 4 is a flowchart illustrating the information processing.

FIGS. 3 and 4 are flowcharts illustrating information processing by the processor 1. The information processing described below is exemplary and a change in a procedure of some processes, omission of some processes, or addition of other processes can be appropriately made.

In Act1, the processor 1 performs an initialization process such as clearing of a commodity list. The commodity list is a list of sales commodities of one commercial transaction target and is stored in the main storage unit 2 or the auxiliary storage unit 3. The commodity list includes a commodity code for identifying at least each of the sales commodities. The commodity list may include data such as a commodity name, a unit price, and the like of each of the sales commodities. In Act2, the processor 1 displays a registration screen on the display device 5. The registration screen is a screen for an operation of registering sales commodities.

Figure 5:
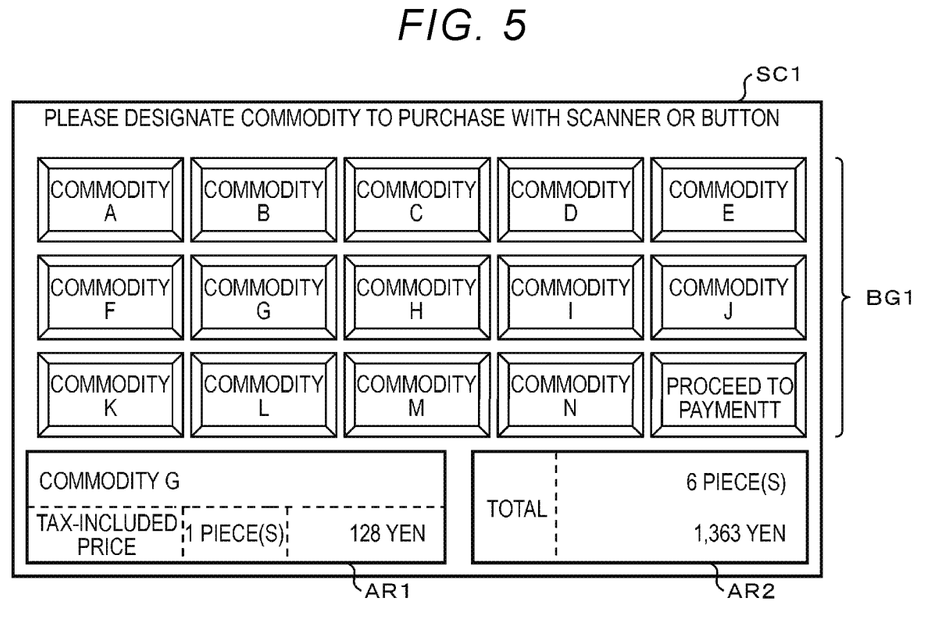
FIG. 5 is a diagram illustrating an example of a form of a registration screen.

FIG. 5 is a diagram illustrating an example of a form of a registration screen SC1. The registration screen SC1 shows a button group BG1 and areas AR1 and AR2. The button group BG1 includes 15 buttons. Each function can be allocated in advance to each button included in the button group BG1. The button group BG1 may include any number of buttons and any function can be allocated to each button, or a designer, a manager, or the like of the checkout device 100 may appropriately decide the number of buttons and a function allocated to each button. In the example of FIG. 5, one button located at the right corner among the buttons included in the button group BG1 is allocated as a button for instructing to proceed to registration finishing and payment. Other buttons of the button group BG1 are allocated to buttons for designating a commodity registered as a sales commodity.

The area AR1 shows a commodity name, a number, and a unit price of a sales commodity designated most recently. A text string of "COMMODITY G," "1 PIECE(S)," and "128 YEN" indicates a commodity name, a number, and a unit price, respectively. The area AR2 shows a total number and a total amount of registered sales commodities. For example, a text string of "6 PIECE(S)" and "1,363 YEN" indicates a total number and a total amount. In FIG. 5, to facilitate understanding information shown in the areas AR1 and AR2, it is indicated how many sales commodities are registered. However, the processor 1 does not show the text strings indicating the foregoing information regarding the sales commodities in the areas AR1 and AR2 in Act2.

In Act3, the processor 1 checks whether the registered sales commodities are designated. Then, when the commodities are not designated, the processor 1 determines that the result is no, and then the process proceeds to Act4. In Act4, the processor 1 checks whether payment is instructed. Then, when the payment is not instructed, the processor 1 determines that the result is no, and then the process returns to Act3. Thus, the processor 1 waits until the commodity is designated or the payment is instructed in Act3 and Act4.

The shopper picks up the purchased commodities purchased by the shopper from a sales area and brings the commodities to a checkout corner. The shopper stands before the checkout device 100 installed in the checkout corner and performs a registration operation of registering the sales commodities. The registration operation is an operation of causing the fixed scanner 7 to read barcodes displayed on the sales commodities, an operation of causing the handy scanner 8 to read the barcodes, an operation of touching the buttons to which the sales commodities are allocated on the registration screen SC1, or the like. When the fixed scanner 7 has a function of identifying commodities using an object recognition technology based on features of images of the commodities, an operation of causing the fixed scanner 7 to image commodities such as fruits and vegetables to which barcodes are not attached is also included in the registration operation.

When one of the registration processes is performed, the processor 1 determines in Act3 that the result is yes, and then the process proceeds to Act5. In Act5, the processor 1 updates the commodity list so that the designated commodities are shown as the sales commodities. The processor 1 adds, for example, the commodities codes of the designated commodities to the commodity list.

In Act10, the processor 1 updates the registration screen displayed on the display device 5. The processor 1 updates display of the areas AR1 and AR2 of the registration screen so that content of the commodity list updated as described above is reflected. Then, the processor 1 subsequently returns to the waiting state of Act3 and Act4. Accordingly, when the processor 1 performs the information processing based on the information processing program, the computer in which the processor 1 is a central unit functions as a registration unit that registers the sales commodities.

When the shopper finishes shopping and finishes the registration of all the sales commodities, the shopper performs an operation decided in advance to instruction payment. For example, the shopper touches the buttons included in the button group BG1 on the registration screen SC1 to give an instruction to move to payment. When the touch sensor 6 detects the touches of the buttons, the processor 1 determines in Act4 that the result is yes, and then the process proceeds to Act7.

In Act7, the processor 1 calculates a payment price of all the sales commodities for selling. As a specific process of calculating the payment price, a similar process to a process performed in the same kind of another checkout device can be applied.

In Act8, the processor 1 selects one of a plurality of method selection screens prepared in advance in accordance with content of a transaction. The method selection screen is a screen on which the shopper selects a payment method. In the embodiment, a first method selection screen and a second method selection screen are assumed to be prepared.

Figure 6:
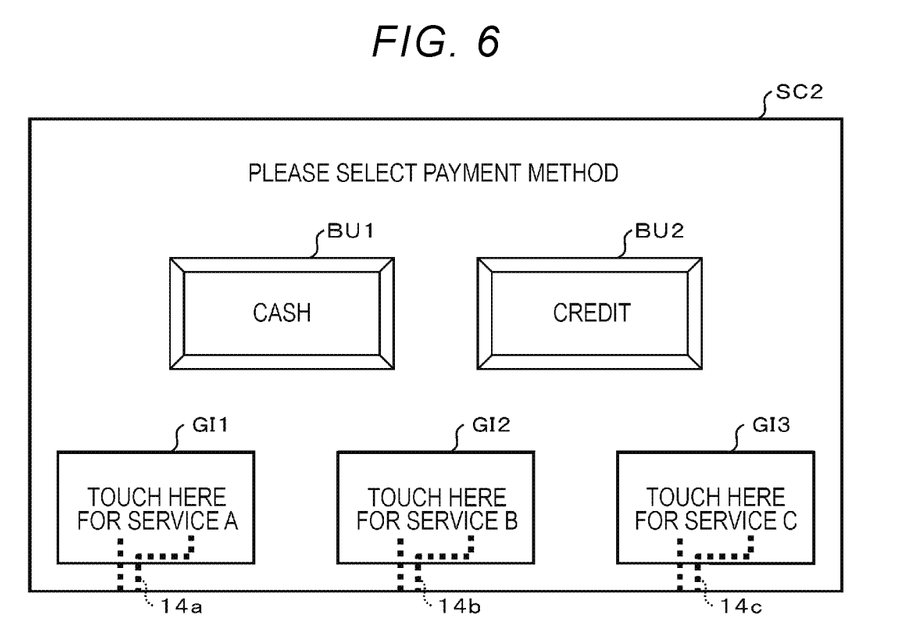
FIG. 6 is a diagram illustrating a first method selection screen.

FIG. 6 is a diagram illustrating a first method selection screen SC2. The first method selection screen SC2 shows buttons BU1 and BU2 and guidance images GI1, GI2, and GI3. In FIG. 6, dotted lines indicate positions of the antennas 14a, 14b, and 14c and are not shown on the first method selection screen SC2.

The button BU1 is a button for selecting payment in cash. The button BU2 is a button for selecting payment by credit. The guidance images GI1, GI2, and GI3 are images for guiding regions which IC tags approach when electronic money payment is used. The guidance images GI1, GI2, and GI3 correspond to the antennas 14a, 14b, and 14c, respectively, and display positions of the guidance images GI1, GI2, and GI3 on the first method selection screen SC2 are decided to face the corresponding antennas. When the electronic money payment is used in a payment service associated with the corresponding antennas, the guidance images GI1, GI2, and GI3 show frame lines indicating the regions to which the IC tags approach and text messages.

The text message informs the shopper where the IC tag approaches when a certain payment service is used. The method selection screen illustrated in FIG. 6 is a screen in which a payment service which is "Service A" is associated with the antenna 14a. Therefore, the text message shown in the guidance image GI1 informs the shopper that the IC tag has to approach the guidance image GI1 when the payment service which is "Service A" is used as "TOUCH HERE FOR SERVICE A."

Accordingly, the first method selection screen is equivalent to a screen that shows an image in which a payment service associated with the corresponding antenna can be identified in each of the plurality of regions corresponding to the plurality of antennas on the display surface of the display device 5. Accordingly, when the processor 1 performs the information processing based on the information processing program, the computer in which the processor 1 is a central unit functions as a control unit that controls the display devices such that the screen is displayed.

Figure 7:
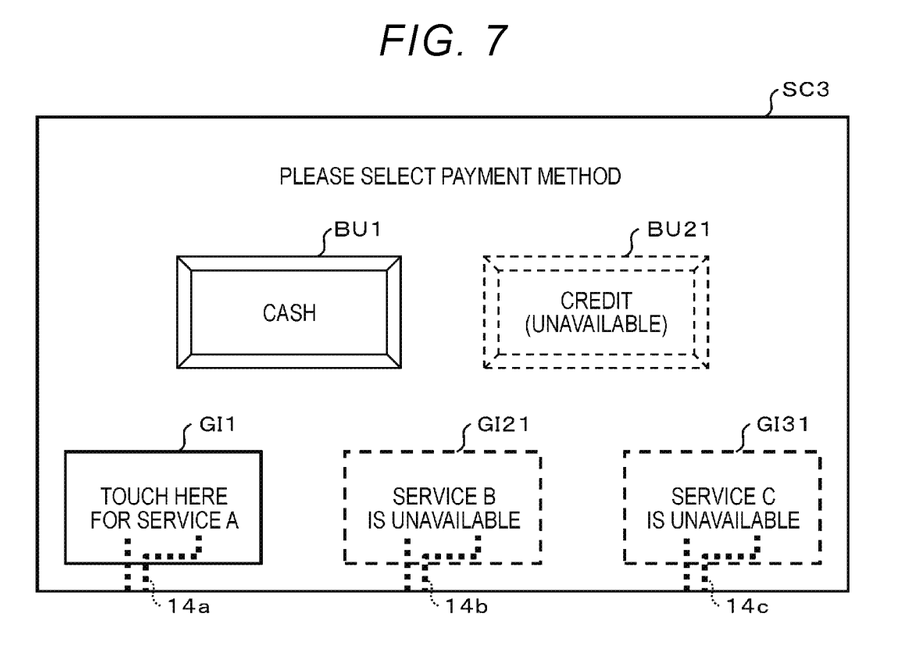
FIG. 7 is a diagram illustrating a second method selection screen.

FIG. 7 is a diagram illustrating a second method selection screen SC3. In FIG. 7, the same reference numerals are given to the same display elements as those illustrated in FIG. 6 and the detailed description thereof will not be repeated. The second method selection screen SC3 shows buttons BU1 and BU21 and guidance images GI1, GI21, and GI31. The second method selection screen SC3 shows the buttons BU21 and the guidance images GI21 and GI31 instead of the button BU2 and the guidance images GI2 and GI3 on the first method selection screen SC2. In FIG. 7, frame lines of the button BU21 and the guidance images GI21 and GI31 are indicated by dotted lines, and this represents to be unavailable by gray-out display.

The processor 1 selects the second method selection screen SC3 when commodities for which only cash payment or electronic money payment is permitted in Service A are included in sale commodities, and selects the first method selection screen SC2 in other cases. When commodities for which combinations of permitted payment methods are different are considered to be sales commodities, a method selection screen adapted thereto is prepared. Three or more method selection screens may be prepared. In Act9, the processor 1 displays the method selection screen selected in this way on the display device 5.

In Act10, the processor 1 instructs the switcher 13 to start scanning by the antennas 14a, 14b, and 14c. At this time, the processor 1 instructs the switcher 13 to select a scanning pattern decided in advance in association with the method selection screen selected in Act8. For a scanning pattern corresponding to the first method selection screen, for example, the antennas 14a, 14b, and 14c are selected in this order. For a scanning pattern corresponding to the second method selection screen, for example, only the antenna 14a is selected normally. The designer, the manager, or the like of the checkout device 100 may appropriately decide the scanning pattern. The switcher 13 connects one of the antennas 14a, 14b, and 14c to the proximity communication unit 12 in the designated scanning pattern.

In Act11 of FIG. 4, the processor 1 checks whether the payment method is designated. Then, when the payment method is not designated, the processor 1 determines that the result is no, and then the process proceeds to Act12. In Act12, the processor 1 checks whether the proximity communication unit 12 enters a state in which the proximity communication unit 12 can communicate with the IC tag. Then, when the proximity communication unit 12 cannot communicate, the processor 1 determines that the result is no, and then the process returns to Act11. Accordingly, the processor 1 waits until the payment method is designated or the proximity communication unit 12 can communicate in Act11 and Act12.

When payment using cash or a credit is desired, the shopper touches the button BU1 or the button BU2 to designate the cash payment or the credit payment. When the touch sensor 6 detects such a button touch, the processor 1 determines in Act11 that the result is yes, and then the process proceeds to Act13. In Act13, the processor 1 decides the designated payment method as a payment method to be used.

In Act14, the processor 1 displays the payment screen in accordance with the decided payment method on the display device 5. The payment screen is a screen for prompting a shopper to perform a payment operation in accordance with the payment method. For example, a payment screen by the cash payment is a screen for prompting a shopper to input cash into the automatic change machine 10. For example, a payment screen by the credit payment is a screen for prompting a shopper to cause the card reader 11 to read a credit card. In Act15, the processor 1 waits until the payment operation is performed. Then, when the cash is input to the automatic machine 10 or the credit card is read in the card reader 11, the processor 1 determines that the result is yes, and then the process proceeds to Act21.

When the shopper desires payment using electronic money, an IC chip on which electronic money data for the payment service to be used is recorded is held to the display surface of the display device 5 so that the IC chip approaches a guidance image in accordance with the payment service. For example, when the electronic money payment in accordance with the payment service A is used, an IC chip corresponding to the payment service A is held to the display surface of the display device 5 so that the IC chip approaches the guidance image GI1.

Then, when the IC chip is located within a sensitivity range of an antenna facing a guidance image which the IC tag approaches among the antennas 14a, 14b, and 14c and the switcher 13 selects this antenna, the proximity communication unit 12 enters a state of communication with the IC tag. In this case, the proximity communication unit 12 instructs the switcher 13 to stop scanning. After the instruction, the switcher 13 keeps selecting the antenna selected at that time. Thereafter, the proximity communication unit 12 reads electronic money data recorded on the IC tag from the IC tag through wireless communication. The electronic money data represents an identification code, a balance, and the like of electronic money. The IC tag records the electronic money data related to a plurality of payment services in some cases. Accordingly, the proximity communication unit 12 reads the electronic money data related to a payment service associated with the antenna selected by the switcher 13 from the IC tag. This process may be performed autonomously by the proximity communication unit 12 or under the control of the processor 1.

When the communication is possible in this way, the processor 1 determines in Act12 that the result is yes, the process proceeds to Act16. In Act16, the processor 1 checks whether the switcher 13 selects a first antenna. Then, when the switcher 13 selects an antenna decided in advance as the first antenna among the antennas 14a, 14b, and 14c, the processor 1 determines that the result is yes, and then the process proceeds to Act17.

In Act17, the processor 1 decides electronic money payment by a first payment service as the payment method to be used. The first payment service is a payment service associated with the first antenna. When the first antenna is the antenna 14a and the payment service which is "Service A" is associated with the antenna 14a, as described above, the first payment service is a payment service which is "Service A." Thereafter, the processor 1 causes the process to proceed to Act21.

In Act18, the processor 1 checks whether the switcher 13 selects the second antenna. Then, when the switcher 13 selects an antenna decided in advance as the second antenna among the antennas 14a, 14b, and 14c, the processor 1 determines that the result is yes, and then the process proceeds to Act19. In Act19, the processor 1 decides electronic money payment by the second payment service as the payment method to be used. The second payment service is a payment service associated with the second antenna. When the second antenna is the antenna 14b and the payment service which is "Service B" is associated with the antenna 14b, the second payment service is a payment service which is "Service B." Thereafter, the processor 1 causes the process to proceed to Act21.

When the switcher 13 selects an antenna decided in advance as a third antenna among the antennas 14a, 14b, and 14c, the processor 1 determines in Act18 that the result is no, and then the process proceeds to Act20. In Act20, the processor 1 decides electronic money payment by the third payment service as the payment method to be used. The third payment service is a payment service associated with the third antenna. When the third antenna is the antenna 14c and the payment service which is "Service C" is associated with the antenna 14c, the third payment service is a payment service which is "Service C." Thereafter, the processor 1 causes the process to proceed to Act21.

As described above, the processor 1 causes the process from Act15, Act17, Act19, or Act20 to proceed to Act21. In Act21, the processor 1 acquires payment data for the payment process in accordance with the decided payment method. In the case of cash payment, the payment data is data or the like of an input price counted by the automatic change machine 10. In the case of credit payment, the payment data is credit data or the like read by the card reader 11 from a credit card. In the case of electronic money payment, the payment data is electronic money data or the like read by the proximity communication unit 12.

In Act22, the processor 1 performs a payment process of paying the payment price calculated in Act7 using the payment method decided in Act13, Act17, Act19, or Act20. The processor 1 uses the payment data acquired in Act21 in the payment process. Here, a similar process to a process performed by the same kind of another checkout device can be applied to the payment process.

As described above, when wireless communication for the payment process starts via one of the antennas 14*a*, 14*b*, and 14*c*, the processor 1 performs the payment process of payment in which a payment service associated with the antenna is used. That is, when the processor 1 performs the information processing based on the information processing program, the computer in which the processor 1 is a central unit functions as a payment unit that performs the payment process in this way.

In Act23, the processor 1 operates the printer 9 to issue a receipt. Thus, the series of processes related to one transaction is completed. Accordingly, the processor 1 returns the process to Act1 of FIG. 3 and prepares for starting a process related to a next transaction.

As described above, in the checkout device 100, a shopper who tries to make payment using electronic money may approach an IC tag to an antenna associated with a payment service to be used among the antennas 14*a*, 14*b*, and 14*c*. That is, the shopper can make electronic money payment by a desired payment service without designating a payment service, for example, operating a button. Therefore, it is possible to reduce trouble of a shopper who is the operator.

In the checkout device 100, a shopper can approach an IC tag to an antenna associated to a payment service to be used when the shopper approaches the IC tag to one of the guidance images GI1, GI2, and GI3 in accordance with a guidance in the guidance images GI1, GI2, and GI3 shown on the first method selection screen SC2. Since work of the shopper at this time is an approach of the IC tag to the display surface of the display device 5 in accordance with display on the display device 5, this work is intuitive work. Thus, it is possible to further reduce the trouble of the shopper.

In the checkout device 100, an operation of registering sales commodities is also received through a touch operation on the display surface of the display device 5. Thus, one of the work and work for selecting a payment service can also be performed on the display surface of the display device 5.

In the checkout device 100, the antennas 14*a*, 14*b*, and 14*c* are disposed to be superimposed on the display surface of the display device 5. Therefore, a separate distance between the antenna and the IC tag approached to the display surface is shorter than when the antennas 14*a*, 14*b*, and 14*c* are disposed on the rear surface side of the display device 5. Therefore, a communication environment between the IC tag and one of the antennas 14*a*, 14*b*, and 14*c* can be satisfactory and a possibility of reliable communication being performed can be high.

In the checkout device 100, when there is a payment service which is not permitted to be used for payment in view of the registered sales commodities, a method selection screen on which the guidance image GI1 related to a service permitted to be used is available is displayed as in the second method selection screen SC3. Therefore, a shopper can easily approach the IC tag to the antenna associated with an available payment service.

The embodiment can be modified in various forms as follows. The checkout device 100 is adapted to a process of selling commodities in a sales store and can also be realized as a sales processing device of a different form such as a vending machine, a ticket machine, an advance payment food ordering machine, etc.

The checkout device 100 performs each process of the registration, the calculation of a payment price, and the payment, but can also be realized as an accounting device that calculates and pays a payment price based on a registration result in another device without performing the registration or the registration and the calculation of the payment price or a payment device that pays a payment prices calculated in another device.

The antennas 14*a*, 14*b*, and 14*c* may be disposed on the rear surface side of the display device 5. Alternatively, the antennas 14*a*, 14*b*, and 14*c* may be disposed so that the antennas 14*a*, 14*b*, and 14*c* are not superimposed on the display device 5.

Any one of the antennas 14*a*, 14*b*, and 14*c* may not be provided. Alternatively, one or more antennas may be additionally provided in addition to the antennas 14*a*, 14*b*, and 14*c*.

A plurality of proximity communication units 12 may be provided. In this case, the same number of proximity communication units 12 as the number of antennas may be provided and each of the antennas may be connected to each of the proximity communication units 12. In this case, the processor 1 may decide a payment service to be used in accordance with a state in which any of the plurality of proximity communication units 12 can communicate with the IC tag. Alternatively, a plurality of proximity communication units 12 less than the number of antennas may be provided and each antenna may be connected to any of the plurality of proximity communication units 12. In this case, the processor 1 may decide a payment service to be used in accordance with whether any of the plurality of proximity communication units 12 communicates with the IC tag via a certain antenna.

Some or all of the functions realized by the processor 1 through the information processing can also be realized by hardware such as a logic circuit that performs information processing which is not based on a program. The foregoing functions can also be realized by combining software control with the hardware such as the logic circuit.

While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A payment device comprising:
a display device;

a plurality of antennas superimposed on the display device and mutually disposed along a display surface of the display device; and a processor configured to:

control the display device to provide a screen including (i) a first image aligned with a first antenna of the plurality of antennas and for identifying a first payment service associated with the first antenna and (ii) a second image aligned with a second antenna of the plurality of antennas and for identifying a second payment service associated with the second antenna;

selectively activate the plurality of antennas to attempt to perform wireless communication with an external device by activating the first antenna to attempt detection of the external device with the first antenna and, if unsuccessful, activating the second antenna to attempt detection of the external device with the second antenna;

in response to detecting the external device with the first antenna, acquire payment information from the external device with the first antenna and perform a first payment process using the first payment service associated with the first antenna; and in response to detecting the external device with the second antenna, acquire the payment information from the external device with the second antenna and perform a second payment process using the second payment service associated with the second antenna.

2. The payment device of claim 1, further comprising a touch sensor superimposed on the display surface of the display device and configured to detect a touch position, wherein the plurality of antennas is disposed between the touch sensor and the display surface of the display device.

3. The payment device of claim 1, wherein the processor is configured to control the display device such that at least one of the first image or the second image indicates that the first payment service or the second payment service, respectively, is unavailable when not permitted to be used with regard to a respective transaction.

4. A sales processing device comprising:

a registration unit configured to register a sales commodity;

a display device;

a plurality of antennas superimposed on the display device and mutually disposed along a display surface of the display device; and a processor configured to:

control the display device to display a first screen for regarding an operation of registering the sales commodity when the registration unit registers the sales commodity;

control the display device to display a second screen including (i) a first image aligned with a first antenna of the plurality of antennas and for identifying a first payment service associated with the first antenna and (ii) a second image aligned with a second antenna of the plurality of antennas and for identifying a second payment service associated with the second antenna;

selectively activate the plurality of antennas to attempt to perform wireless communication with an external device by activating the first antenna to attempt detection of the external device with the first antenna and, if unsuccessful, activating the second antenna to attempt detection of the external device with the second antenna;

in response to detecting the external device with the first antenna, acquire payment information from the external device with the first antenna and perform a first payment process of paying a payment price with regard to the sales commodity by using the first payment service associated with the first antenna; and in response to detecting the external device with the second antenna, acquire payment information from the external device with the second antenna and perform a second payment process of paying the payment price with regard to the sales commodity by using the second payment service associated with the second antenna.

5. The sales processing device of claim 4, further comprising a touch sensor superimposed on the display surface of the display device and configured to detect a touch position, wherein the plurality of antennas is disposed between the touch sensor and the display surface of the display device.

6. The sales processing device of claim 5, wherein the processor is configured to:

control the display to display the second screen including a first payment option button corresponding to a third payment process and a second payment option button corresponding to a fourth payment process different from the third payment process;

initiate the third payment process in response to selection of the first payment option button via the touch sensor; and initiate the fourth payment process in response to selection of the second payment option button via the touch sensor.

7. The sales processing device of claim 6, wherein the processor is configured to selectively activate the plurality of antennas while neither the first payment option button nor the second payment option button is selected.

8. The sales processing device of claim 6, wherein the first payment process is a first electronic payment process, the second payment process is a second electronic payment process, the third payment process is a cash payment process, and the fourth payment process is a credit card payment process.

9. A payment device comprising:

an interface including:

a display having a display surface;

a first antenna disposed along the display surface;

a second antenna disposed along the display surface; and a touch sensor disposed along the display surface and over the first antenna and the second antenna; and a processor configured to:

control the display to provide a payment selection screen including a first payment option button corresponding to a first payment process, a second payment option button corresponding to a second payment process different from the first payment process, a first guidance image aligned with the first antenna, and a second guidance image aligned with the second antenna;

initiate the first payment process in response to selection of the first payment option button via the touch sensor;

initiate the second payment process in response to selection of the second payment option button via the touch sensor;

while neither the first payment option button nor the second payment option button is selected, selectively activate the first antenna to attempt to detect an external device to perform wireless communication, and if wireless communication is not successful, activate the second antenna to attempt to detect the external device to perform wireless communication;

in response to detecting the external device with the first antenna, acquire payment information from the external device with the first antenna and perform a third payment process using a first payment service associated with the first antenna; and in response to detecting the external device with the second antenna, acquire the payment information from the external device with the second antenna and perform a fourth payment process using a second payment service associated with the second antenna.

10. The payment device of claim 9, wherein the touch sensor, the first antenna, and the second antenna are transparent such that displays provided by the display are visible through the first antenna, the second antenna, and the touch sensor.

11. The payment device of claim 9, wherein the external device is an integrated circuit tag.

12. The payment device of claim 9, wherein the first payment process is a cash payment process, the second payment process is a credit card payment process, the third payment process is a first electronic payment process, and the fourth payment process is a second electronic payment process.

13. The payment device of claim 9, wherein the processor is configured to control the display such that at least one of the first guidance image or the second guidance image indicates that the first payment service or the second payment service, respectively, is unavailable when not permitted to be used with regard to a respective transaction.

* * * * *